(12) United States Patent
Ridge

(10) Patent No.: US 6,937,759 B2
(45) Date of Patent: Aug. 30, 2005

(54) METHOD AND DEVICE FOR REDUCING IMAGE BY PALETTE MODIFICATION

(75) Inventor: Justin Ridge, Sachse, TX (US)

(73) Assignee: Nokia Corporation, Espoo (FI)

( * ) Notice: Subject to any disclaimer, the term of this patent is extended or adjusted under 35 U.S.C. 154(b) by 610 days.

(21) Appl. No.: 10/090,425

(22) Filed: Feb. 28, 2002

(65) Prior Publication Data

US 2003/0161541 A1 Aug. 28, 2003

(51) Int. Cl.[7] .................................................. G06K 9/00
(52) U.S. Cl. ....................... 382/167; 382/251; 345/593; 345/589; 358/527
(58) Field of Search ................................. 382/166, 167, 382/168, 232, 245, 225, 251; 345/591, 593, 582, 431, 199, 139, 615; 395/131; 348/32, 33, 34; 358/520, 518, 527

(56) References Cited

U.S. PATENT DOCUMENTS 4,857,991 A * 8/1989 Music et al. ........... 375/240.01
5,341,464 A * 8/1994 Friedman et al. ........... 345/590
5,463,702 A * 10/1995 Trueblood .................. 382/239
6,674,907 B1 * 1/2004 Shum et al. ................. 382/225

FOREIGN PATENT DOCUMENTS

JP          0737059     2/1995    ............. G06T/1/00
JP          1306067     11/1999   ........... G06F/12/00

* cited by examiner

*Primary Examiner*—Kanjibhai Patel
*Assistant Examiner*—Ali Bayat
(74) *Attorney, Agent, or Firm*—Ware, Fressola, Van der Sluys & Adolphson LLP

(57) ABSTRACT

A method and device for reducing an input image by modifying the palette used in image compression. The reduction process involves mapping one or more colors of the original palette to a single color in a new palette. The image size of the reduced image is estimated from the entropy of the input image and that of the modified palette. A scaling factor, which can be computed from the image statistics inherent to the input image, is also used for adjusting the estimated image size of the reduced image.

38 Claims, 4 Drawing Sheets

METHOD AND DEVICE FOR REDUCING IMAGE BY PALETTE MODIFICATION

FIELD OF THE INVENTION

The present invention relates generally to image processing and, more specifically, to file size reduction for images stored in a palette-based compressed form.

BACKGROUND OF THE INVENTION

Often, the size of a digital image stored on one device may need to be reduced in order for the image to be stored or displayed on a different device. For example, a large, high-quality digital image stored on a server may exceed the memory limitations of a mobile device. In order for the mobile device to store and display the image, it would be necessary to reduce the size of the previously compressed image.

If memory capacity were the only limitation, it would be possible to devise an algorithm to reduce the image size as the image is received (prior to storage), rather than reducing the size prior to transmission. However, in reality, other limitations also apply. For example, some protocols limit the maximum message size that can be transmitted to the mobile device. In that case, the image size must be reduced prior to (not after) transmission. Additionally, even when the maximum message size is sufficient to accommodate the image, reducing image size on the receiving end may waste significant bandwidth, resulting in cost inefficiencies.

Furthermore, because processing time is directly related to how many images per second an operator can handle, there is a clear economic relationship between the time taken to reduce an image and the cost of doing so. Such a relationship exists for multimedia messaging services, motivating the need for an efficient size-reduction method. In this specification, "size" means the number of bytes utilized by the compressed image. Thus, a "large" image is one that occupies many bytes in a storage space.

In the past, palette-based compressed images were reduced using a brute-force approach, where the compressed image is partially decompressed by decoding it to yield palette index values. The partially decompressed image is re-quantized using an altered palette and recompressed repeatedly until the size of the re-compressed image meets a target size. As shown in FIG. 1, the brute-force approach usually involves many iterative steps. If the recompressed image is too large or too small as compared to the target size, the palette is readjusted and the palette indices are updated to reflect the new palette. This brute-force approach, in general, is time-consuming due to the repeated compression. In the above-described method, the repeated compression is terminated when the size of the recompressed image meets the target size. Alternatively, the repeated compression can be terminated when the quality of the recompressed image reaches an unacceptable level. In this alternative approach, a palette is selected to meet a target number of palette colors, and an output image is produced based on the selected palette so as to allow a user to judge whether the quality of the output image is acceptable. This approach requires the input of a user and, therefore, is unsuitable for an image-related application in an automated environment.

It should be noted that image size reduction could also be achieved by decreasing the image resolution or by changing the compression format. However, resolution reduction may not always be desirable in that it may not yield acceptable image quality. While format conversion may produce images of comparable quality, it may not result in a smaller image size. Because palette-based schemes are almost always followed by lossless compression, such as in the GIF format, there is no scope for reducing the size of the image after a palette has been developed. When a compressed image in the GIF format is converted to the JPEG format, for example, the size of the converted image may actually increase.

Most previous work with image palettes is concerned with mapping true color (RGB) values of an image onto a finite-size palette, or mapping one palette to another palette. The former approach, which is generally associated with a display device, has been disclosed in Shibata et al. (JP07-037059). The latter approach, which is used when the size of the new palette is known but the palette content may be unknown, has been disclosed in Okuda et al. (JP11-306067). Although these approaches can reduce colors of an image to achieve a certain palette size, they may or may not lead to size reduction. Moreover, the amount of image size reduction cannot be predicted or controlled.

It is desirable and advantageous to provide a method and device for image size reduction wherein the iterative steps can be reduced both in number and in complexity, and wherein the amount of image size reduction can be estimated and controlled.

SUMMARY OF THE INVENTION

The present invention reduces an input image by modifying the palette used in color quantization. It involves mapping one or more colors from the original palette to a single color in a new palette.

According to the first aspect of the present invention, there is provided a method of reducing an input image of an original image size (F, N) for providing a reduced image of a target image size ($F_n$) smaller than the original image size, wherein the input image is formed from a first palette and contains image statistics (L,H) inherent to palette index coefficients indicative of the input image, the first palette having a first palette size with a first number of colors. The method comprises the steps of:

selecting a second palette size smaller than the first palette size; and color mapping the first palette based on the second palette size for providing a second palette for use in forming the reduced image, the second palette having a second number of colors smaller than the first number of colors by a reduction ratio (R).

Preferably, the method also comprises the steps of:

obtaining a first statistical size ($S_0$) of the input image based on the image statistics (L, H) and the original image size (N) of the input image;

computing a second statistical size (S) of the reduced image based on the second palette; and estimating the image size ($S_f$) of the reduced image based on the first image size (F), the first statistical size ($S_0$), the second statistical size (S) and the reduction ratio (R).

Preferably, the method further comprises the steps of:

adjusting the second palette size; and repeating the color mapping, computing and estimating steps until a difference between the estimated image size ($S_f$) and the target image size ($F_n$) falls within a predetermined limit.

According to the second aspect of the present invention, there is provided a device for reducing an input image of an original image size (F, N) to provide a reduced image of a target image size ($F_n$) smaller than the original image size, wherein the input image is formed from a first palette and contains image statistics (L,H) inherent to palette index coefficients indicative of the input image, the image statistics providing a first statistical size ($S_0$), the first palette having a first palette size with a first number of colors, and wherein said image size reduction is based on a selected palette size. The device comprises a color mapping means, responsive to the selected palette size, for obtaining a second palette and for providing palette information indicative of the second palette, the second palette having a second number of colors smaller than the first number of colors by a reduction ratio (R) for use in forming the reduced image.

Preferably, the device further comprises:

a computing means, responsive to the palette information, for providing a second statistical size (S) of the reduced image based on the second palette; and an estimating means, responsive to the second statistical size (S), for providing an estimated image size ($S_f$) of the reduced image, based on the first image size (F), the reduction ratio (R), the first statistical size ($S_0$).

Advantageously, a scaling factor (ESF) is provided for adjusting the estimated image size ($S_f$).

The present invention will become apparent upon reading the description taken in conjunction with FIGS. 2 to 4.

BEST MODE TO CARRY OUT THE INVENTION

The present invention applies to images that have already been color-quantized to a finite-color palette and compressed, such as images stored in the GIF format. The method involves the steps of determining how the palette should be adjusted in order to reduce the image to a target size. The present invention makes use of image statistics, such as the average run-length between index changes and the histogram, inherent to an input image that has been previously compressed. Thus, in order to gather the image statistics, the compressed image must be decoded or partially decompressed.

Figure 1:
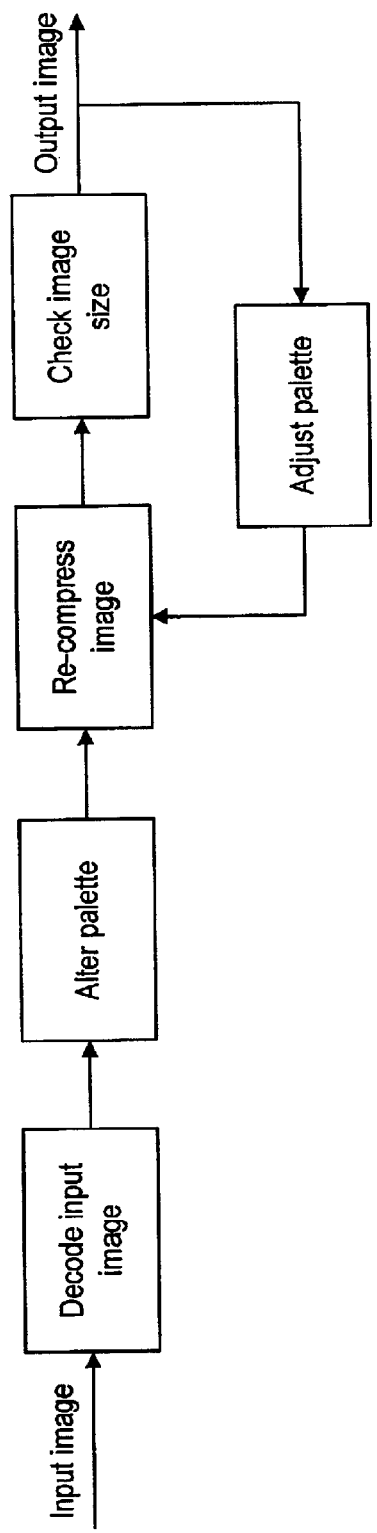
FIG. 1 is a block diagram illustrating a brute-force image reduction approach.
Figure 2:
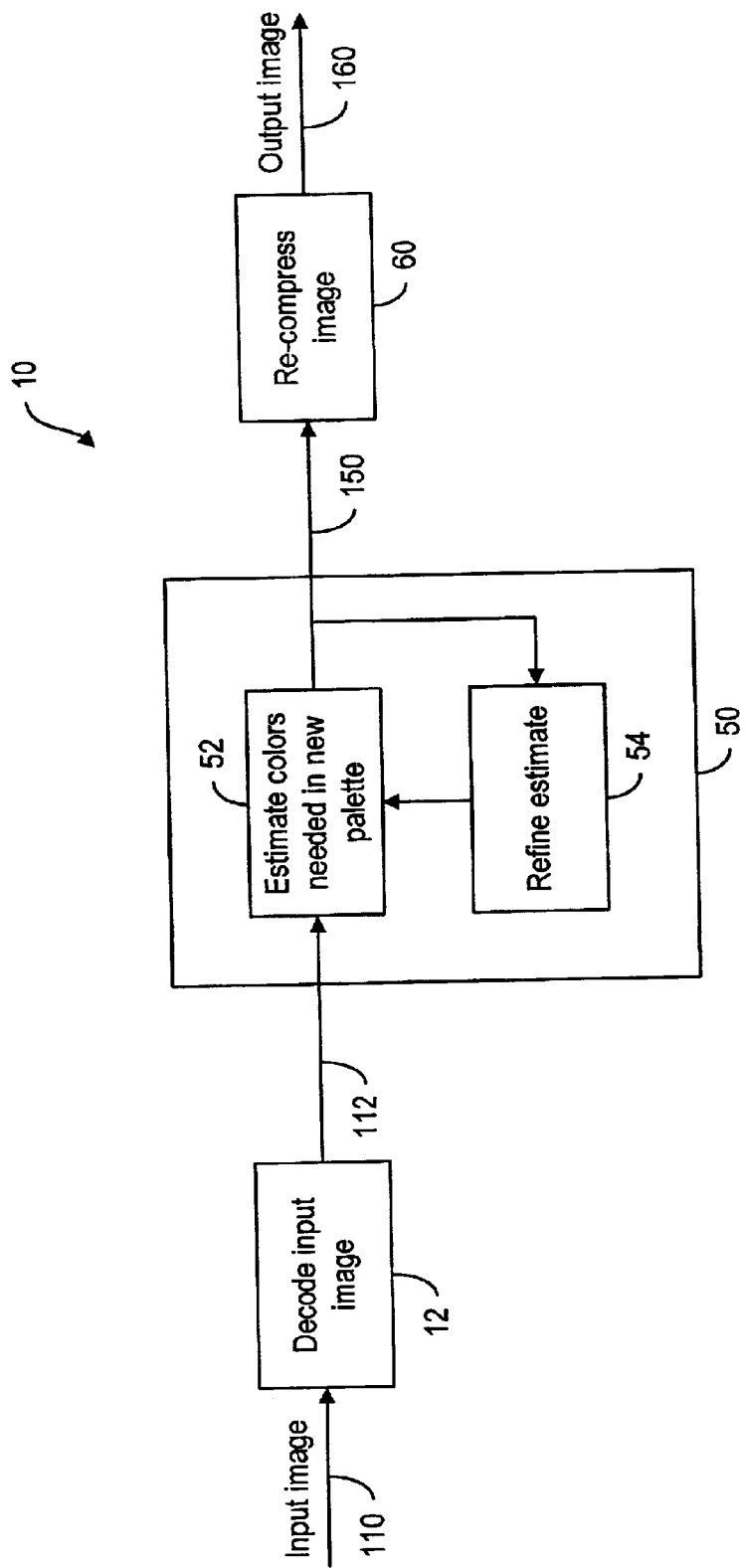
FIG. 2 is a block diagram illustrating the principle of image reduction, according to the present invention.

As shown in FIG. 2, a previously-compressed image 110 is partially decompressed by a decoder 12 so that the palette indices in the input image can be read. Based on the average run-length between index changes and histogram read from the partially decompressed image 112, a file size estimator 50 is used to estimate the size of an output image formed from a new palette of a reduced palette size. Given the statistics of the input image, the estimator 50 uses a computation means 52 to estimate the color needs in the new palette that would be used to re-quantize the partially decompressed image before the partially decompressed image is recompressed to produce an output image. Given the estimated number of colors in the new palette, a corresponding estimate of the output image size using that palette can be produced. It may be that the estimated size of the output image does not meet the target size. The estimation process must usually be iterated several times before the estimated size of the output image meets the target size. In each iteration, the new palette is refined by an adjusting means 54. Finally, after the predicted size meets the target size, the re-quantized image 150 is re-compressed by a compression module 60 for providing an output image 160.

The statistics of primary importance required by the estimator 50 are the image histogram and the average run-length L between a change of palette index values. The statistics can be found by raster scanning the partially decompressed image 112 only once in a straightforward manner. The image histogram, which is the number of times each palette index occurs, can be directly used to compute the entropy $H_0$ of the index terms in the original compressed image. In general, entropy H in "bits per pixel" can be calculated from the image histogram as follows:

$$H = -\frac{1}{N}\sum_i p(i)\log_2 p(i) \qquad (1)$$

where N is the number of pixels in the compressed image, and p(i) is the probability of palette index i occurring, equivalent to $p(i)=C_i/N$, $C_i$ being the number of times palette index i occurs in the image, and the series of $C_i$ values is the image "histogram".

A prediction of the compressed image size in bits, hereafter referred to as the statistical size, is given by the number N of pixels times the entropy H as follows:

$$S = -\sum_i p(i)\log_2 p(i). \qquad (2)$$

At first glance, it seems possible to use the statistical size, as defined by Eq. 2, to directly predict the file size of a reduced compressed image, so long as one can estimate the color needs in a new palette for re-quantizing the partially decompressed image. However, such prediction is not always accurate. There are two problems with such a simplistic predictor. First, it assumes that each pixel in the image is independent of all other pixels. That is, knowing one pixel value tells us nothing about its neighbors. In practice, this is generally quite untrue, because graphical images tend to contain large regions of solid color. Thus, if one pixel value is known, the prediction that the neighboring pixel value will be the same has a good chance of being correct. Because the simple entropy calculation above fails to take into consideration the "correlation" between pixels, the estimated size of the image may be inflated. Secondly, the prediction also assumes that the compression method used in practice is as good as the theoretical limit. In reality, this is rarely true. Compression algorithms tend to take "short cuts" due to memory or complexity constraints, and almost never reach the theoretical limit. This applies to the LZW (Lempel-Ziv-Welch, also known as LWZ) scheme employed by the GIF format, and this means the entropy measure is sometimes less than the actual compressed size.

One way to correct the former problem is to consider the "second-order" entropy of the image. Since LZW compression is dictionary-based and can encode several pixels at once, we can expand the histogram to measure the number of "pairs" of index coefficients, so that the size prediction becomes $$S_2 = -\sum_i \sum_j p(i,j)\log_2 p(i,j) \qquad (3)$$

where (i, j) are the palette index values of adjacent pixels in the original compressed image. This concept can be extended to consider larger sequences of pixels, but the approach encounters complexity problems, and the memory required for temporary storage can become prohibitive. Additionally, this approach does not solve the second problem of inherent inefficiency in the LZW algorithm.

Thus, according to the present invention, these above-identified problems are rectified by "scaling" the entropy value depending on other image statistics, in order to achieve a viable estimate without paying a large computational or memory penalty. The scaling process is described below.

Two other statistics of interest include the color ratio R and the average run length L. The color ratio R is the ratio of the proposed number of colors (the number of colors in the proposed new palette) to the number of colors in the original palette. Average run length L is defined as the average distance (in pixels) between a change in the index value, assuming the pixels are scanned in raster fashion. Average run length can be calculated in one raster scan of the image at the same time as the histogram is obtained, using the pseudocode below.

```
for y = 1 to image_height
    for x = 1 to image_width
        idx = colour index of pixel at (x,y)
        histogram[idx] = histogram[idx] + 1
        if idx <> last_index,
            total_rl = total_rl + this_rl
            rl_count = rl_count + 1
            last_index = idx
            this_rl = 0
        else
            this_rl = this_rl + 1
        end
    end
L = total_rl / rl_count
```

Having obtained these "secondary statistics", the present invention carries out entropy scaling depending on the characteristics of the input image as follow:

a) In most cases, the average run length L can be scaled using a hyperbolic function, such as $$L\gamma = 0.3 + \tan h(L-1) \quad (4)$$

in order to make it a more meaningful value for the entropy calculation. An entropy scaling factor (ESF) is then calculated as $$ESF = 1 + 0.05 \log_2 R.L\gamma \quad (5)$$

where R is the color ratio. Since the number of colors in the palette is always reduced, the ratio is always less than one, meaning that ESF is generally slightly less than one. This scaling is based on the fact that as the number of colors decreases, the average run length will become longer, and thus the entropy measure will start to become inflated.

b) When the average run length is small, or less than some threshold $T_{rl}$ the first-order entropy will be only slightly different from the higher-order entropies. For example, a threshold of $T_{rl}=0.5$ can be used, meaning that, on average, no more than half the pixels have the same index as their neighbor does for this section to apply. Consequently, there is only a small possibility of inflating the estimate, although there is still the possibility of deflating the estimate due to inefficiencies in the LZW algorithm. In such cases, $L\gamma=1$ is used and ESF becomes $$ESF = 1 + 0.05 \log_2 R \quad (6)$$

c) When the original number of colors is very small, or less than some threshold $T_c$, inflation of the estimate due to the use of the first-order entropy will not be exacerbated by removing additional colors. Therefore, an ESF of one can be used, or $$ESF = 1 \quad (7)$$

Each scale factor is clipped to ensure that it falls within reasonable bounds. It should be noted that because the estimate is based upon image statistics, it is possible that an "unusual" image will cause the value of ESF to be extremely high or extremely low, to the point of being meaningless. To circumvent such problems, a lower bound and upper bound can be used to limit the scale factor. For example, if the calculated ESF is less than the lower bound, it is set to the lower bound. If the calculated ESF is greater than the upper bound, it is set to the upper bound. If it falls between the bounds, it is left untouched. Other scaling or clipping functions can be used depending upon the statistical profile of images being processed.

In addition to scaling the entropy to account for "overshoots" or "undershoots" due to the image characteristics, the estimate is also normalized by measuring the entropy of the original compressed image. Thus, the file size estimate is given by $$S_f = S \times ESF \times \frac{F}{S_o} \quad (8)$$

where F is the file size of the originally compressed image, $S_O$ is the statistical size of the original compressed image, and S is the statistical size related to the image re-quantized by the new palette.

The foregoing description has assumed that a target number of colors in the new palette is known and, accordingly, the size of the output image if it were compressed using that palette can be estimated. In reality, the target palette size is not known; it can be found by repeating the estimation process several times and comparing the estimated and target sizes. The iteration process for finding the target palette can be carried out in accordance with the pseudocode example as shown below:

```
palette_size = initial_pal_size
est_size = target_size + 1
while (target_size < est_size)
    est_size = size estimated using algorithm
    if (est_size > target_size)
        adjust palette_size
end
```

As shown in Eq.5 and Eq.8, the file size prediction, $S_f$ requires five terms: the file size of the original (F), the original statistical size ($S_O$), the average run-length (L), the color ratio (R), and the statistical size (S) of the proposed output image that can be calculated from the image histogram. Of these terms, the first three are calculated once and do not need to be updated for each predictive iteration, whereas the last two must be re-calculated. Since the color ratio is a simple division, the effort required to update it is negligible. Hence the bulk of the effort associated with iterating the estimation is associated with re-calculating the histogram. The efficiency with which this invention is able to update the histogram is worthy of particular attention.

To find a new palette of a certain size, the original palette is treated as an image, consisting of one pixel in each of the original palette colors. This "image" is then color-quantized to the desired palette size. Not only does this process generate a new palette, but this color-quantized "image" also indicates which new palette index corresponds to each of the old palette indices. Effectively, this process yields the mapping function:

$$\hat{i} = M(i) \quad (9)$$

Now consider the histogram. Since each pixel index in the original image is now re-mapped to an index in the new palette, the number of each of the palette indices occurring in the new image will be $$\hat{C}_i = \sum_{\{j|M(j)=i\}} C_j \qquad (10)$$

It should be noted that generating the new counts does not require the image to be raster-scanned, as required in the gathering of the statistics of the partially decompressed image. Instead, the new counts can be obtained by retaining the counts from the original image, and assigning them to the appropriate "bin" in the color-quantized version. In the case of the GIF format, this means a maximum of 256 additions, which can be considered a negligible effort. As such, the probability of each index in the proposed new image is known, and the statistical size calculation for the proposed new image can be carried out.

In summary, the estimation process is quick, and therefore iterating it instead of the compression process (which is comparatively very slow) can produce a substantial savings in terms of computational effort.

Figure 3:
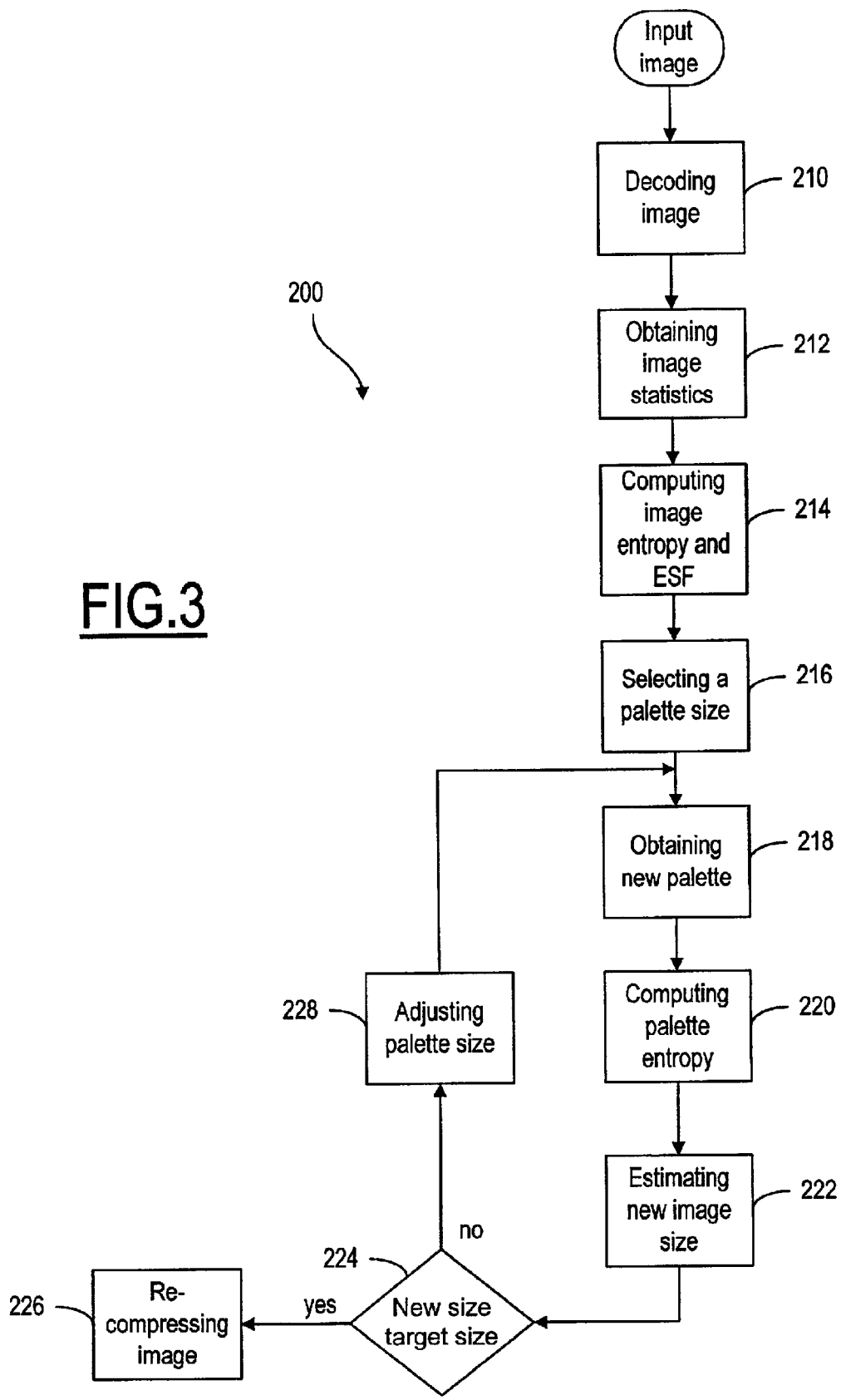
FIG. 3 is a flowchart illustrating the image reduction method, according to the present invention.

Incorporating the foregoing analysis, a method of image size reduction for achieving an output image with a target size $F_n$ is illustrated in the flowchart 200, as shown in FIG. 3. As shown in FIG. 3, after the compressed image is received, it is decoded at step 210 to yield the palette indices i. At step 212, the image statistics of the original compressed image 110 are gathered for computing the image entropy H (Eq. 1), the statistical size $S_0$ (Eq.2) and ESF (Eq.6–Eq.8) at step 214. A palette size is selected at step 216 so that a new palette can be obtained at step 218. From the mapping function between the new palette and the original palette, the entropy of the new palette, and thus the statistical size S of the proposed new image, are computed at step 220. As the color ratio R can be found, the file size $S_f$ of the image according with the new palette can be estimated (Eq.8) at step 222. If the estimated size $S_f$ is substantially equal to the target size $F_n$, then the partially decompressed image re-quantized with the new palette is recompressed for providing the output image 160 at step 226. If the estimate size $S_f$ is smaller or greater than $F_n$, the palette size for the new palette is adjusted at step 228 and a new iteration starts at step 218.

Figure 4:
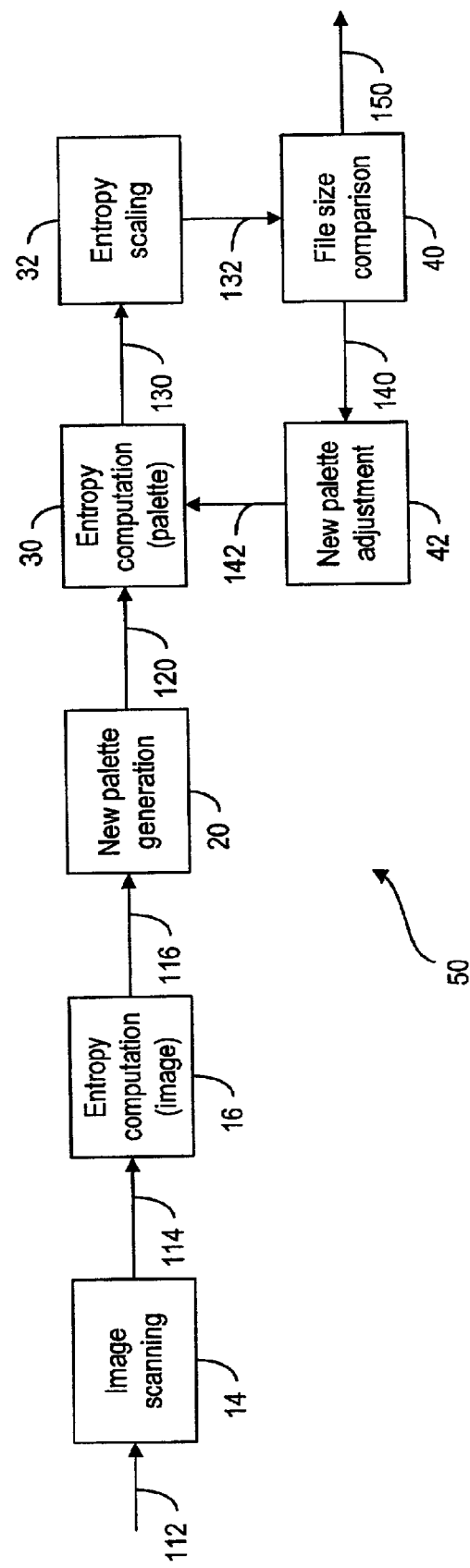
FIG. 4 is a block diagram illustrating a device for image reduction, according to the present invention.

In order to facilitate the method of image size reduction, according to the present invention, the estimator 50 (FIG. 2), can be constructed with a number of components, as shown in FIG. 4. As shown in FIG. 4, an image scanning module 14 is used to raster scan the partially decompressed image 112 to yield palette index values i for providing the probability p(i) of palette index i occurring. The image statistics related to palette index values, their occurrence probability, and the average run-length L are denoted by reference numeral 114. An entropy computation module 16, responsive to the image statistics 114, is used to compute the entropy H, the statistical size $S_0$ of the original compressed image 110, and the entropy scaling factor, ESF. This entropy-related information provided by module 16 is collectively denoted by reference numeral 116. At this point, a proposed palette size should be selected and the original palette is color-quantized by a new palette generation module 20 to obtain a new palette. In fact, the new palette can be produced from the old palette by the mapping function $\hat{i}=M(i)$. The new indices and the occurrence probability of the new indices are denoted by reference numeral 120. Based on the indices of the new palette, the statistical size S of the proposed new image color-quantized by the new palette is computed by module 30 using Eq.2. The statistical size S and other parameters ($S_0$, F, ESF, R), collectively denoted by reference numeral 130, are used to estimate the file size $S_f$ of the reduced image 160. (FIG. 2). The estimated file size $S_f$, is compared to the target file size $F_n$ by a comparison means 40. Based on the comparison result 140, an adjusted new palette 142 is provided by adjustment means 42 to the entropy computation module 30 for iteration. The process is repeated until the estimated size $S_f$ is substantially equal to the target file size $F_n$, or the difference between the estimated size $S_f$ and the target file size $F_n$ falls within a predetermined limit.

The proposed palette size must be updated by an adjustment means 42 (FIG. 4) at step 228 (FIG. 3), when subsequent estimations are required. There are many possible approaches for palette size updating. One such approach is to decrement the palette size by one for each estimation (arithmetic progression). Alternatively, the palette size is reduced by a certain factor, such as 0.5, after each iteration (geometric progression). A third approach would be to use a segmentation approach, which involves dividing the possible new palette sizes into half (e.g. 1–127, 128–255) and determining which half the solution should belong to, then further dividing that section (e.g. 1–63, 64–127) until the solution is found.

It should be noted that the entropy scaling factor (ESF), in most cases, is calculated using Eq. 5, where the average run-length L is scaled using a hyperbolic function of the form:

$$L\gamma = \alpha + \tan h(L-1). \qquad (11)$$

However, any similar function can also be used for such scaling. Also, it is possible to use a scaling factor, which is slightly smaller than 1 and independent of the color ratio R for estimating the file size using Eq. 8.

The present invention is agnostic toward the update method actually used. Additionally, because this is a statistical process and the estimate does not predict the size of a new compressed image with 100% accuracy, there is little benefit to be gained from iterating the process until the precise size of the new palette is found. Since the improvement in estimated size would be outside the margin of error in the algorithm, the iteration should be terminated when the difference between the estimated size ($S_f$) and the target file size ($F_n$) falls within a reasonable limit. For the same reason, the update algorithm used will not play a significant role unless the palette size is sufficiently large.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method of reducing an input image of an original image size (F, N) for providing a reduced image of a target image size ($F_n$) smaller than the original image size, wherein the input image is formed from a first palette and contains image statistics (L,H) inherent to palette index coefficients indicative of the input image, the first palette having a first palette size with a first number of colors, said method comprising the steps of:

selecting a second palette size smaller than the first palette size; and color mapping the first palette based on the second palette size for providing a second palette for use in forming the reduced image, the second palette having a second number of colors smaller than the first number of colors by a reduction ratio (R), wherein the reduction ratio is at least partially based on a relationship between the target image size and the original image size.

2. The method of claim 1, wherein the second palette size is selected based on the image statistics of the first palette.

3. The method of claim 2, wherein the image statistics include entropy (H) of the palette index coefficients in the input image.

4. The method of claim 2, wherein the image statistics include entropy (H) and average run length (L) of the palette index coefficients in the input image.

5. The method of claim 1, wherein the input image is provided in a GIF format.

6. A method of reducing an input image of an original image size (F, N) for providing a reduced image of a target image size ($F_n$) smaller than the original image size, wherein the input image is formed from a first palette and contains image statistics (L,H) inherent to palette index coefficients indicative of the input image, the first palette having a first palette size with a first number of colors, said method comprising the steps of:

selecting a second palette size smaller than the first palette size; and color mapping the first palette based on the second palette size for providing a second palette for use in forming the reduced image, the second palette having a second number of colors smaller than the first number of colors by a reduction ratio (R);

obtaining a first statistical size ($S_0$) of the input image based on the image statistics (L,H) and the original image size (N) of the input image;

computing a second statistical size (S) of the reduced image based on the second palette; and estimating the image size ($S_f$) of the reduced image based on the first image size (F), the first statistical size ($S_0$), the second statistical size (S) and the reduction ratio (R).

7. The method of claim 6, further comprising the steps of adjusting the second palette size; and repeating the color mapping, computing and estimating steps until a difference between the estimated image size ($S_f$) and the target image size ($F_n$) falls within a predetermined limit.

8. The method of claim 6, wherein the first statistical size ($S_0$) is computed based on $$S = -\sum_i p(i) \log_2 p(i),$$

wherein p(i) is the probability of palette index i occurring, equivalent to $p(i)=C_i/N$, $C_i$ being the number of times palette index i occurs in the input image and N being the number of pixels in the input image.

9. The method of claim 6, further comprising the step of providing a scaling factor (ESF) for adjusting the estimated image size ($S_f$).

10. The method of claim 9, wherein the scaling factor (ESF) is computed based on the reduction ratio (R).

11. The method of claim 10, wherein the scaling factor (ESF) is computed from a logarithmic function of the reduction ratio (R).

12. The method of claim of claim 11, wherein the scaling factor (ESF) is computed from $$ESF = 1 + 0.005 \log_2 R.$$

13. The method of claim 9, wherein the scaling factor (ESF) is computed based on the image statistics (L) and the reduction ration (R).

14. The method of claim 13, wherein the image statistics include average run-length (L) of palette index coefficients in the input image.

15. The method of claim 14, wherein the scaling factor (ESF) is computed from a logarithmic function of the reduction ration (R) and a hyperbolic function of the average run-length of the input image.

16. The method of claim 15, wherein the scaling factor (ESF) is computed from $$ESF = 1 = 0.05 \log_2 R . L\gamma$$

where $L\gamma = 0.3 + \tanh(L-1)$.

17. The method of claim 9, wherein the scaling factor ESF is equal to or slightly less than 1.

18. A device for reducing an input image of an original image size (F, N) to provide a reduced image of a target image size ($F_n$) smaller than the original image size, wherein the input image is formed from a first palette and contains image statistics (L,H) inherent to palette index coefficients indicative of the input image, the image statistics providing a first statistical size ($S_0$), the first palette having a first palette size with a first number of colors, and wherein said image size reduction is based on a selected palette size, said device comprising:

color mapping means, responsive to the selected palette size, for obtaining a second palette and for providing palette information indicative of the second palette, the second palette having a second number of colors smaller than the first number of colors by a reduction ratio (R) for use in forming the reduced image, wherein the reduction ratio is at least partially based on a relationship between the target image size and the original image size.

19. The device of claim 18, wherein the second palette size is selected based on the image statistics of the first palette.

20. The device of claim 19, wherein the image statistics include entropy (H) of the palette index coefficients in the input image.

21. The device of claim 19, wherein the image statistics include entropy (H) and average run length (L) of the palette index coefficients in the input image.

22. The device of claim 18, wherein the input image is provided in a GIF format.

23. The device of claim 18, wherein the first statistical size ($S_0$) is computed based on $$S = -\sum_i p(i) \log_2 p(i),$$

wherein p(i) is the probability of palette index i occurring, equivalent to $p(i)=C_i/N$, $C_1$ being the number of times palette index i occurs in the input image and N being the number of pixels in the input image.

24. A device for reducing an input image of an original image size (F, N) to provide a reduced image of a target image size ($F_n$) smaller than the original image size, wherein the input image is formed from a first palette and contains image statistics (L,H) inherent to palette index coefficients indicative of the input image, the image statistics providing a first statistical size ($S_0$), the first palette having a first palette size with a first number of colors, and wherein said image size reduction is based on a selected palette size, said device comprising:

color mapping means, responsive to the selected palette size, for obtaining a second palette and for providing palette information indicative of the second palette, the second palette having a second number of colors smaller than the first number of colors by a reduction ratio (R) for use in forming the reduced computing means, responsive to the palette information, for providing a second statistical size (S) of the reduced image based on the second palette; and estimating means, responsive to the second statistical size (S), for providing an estimated image size ($S_f$) of the reduced image, based on the first image size (F), the reduction ratio (R), the first statistical size ($S_0$).

25. The device of claim 24, further comprising means for providing a scaling factor (ESF) for adjusting the estimated image size ($S_f$).

26. The device of claim 25, wherein the scaling factor (ESF) is computed based on the reduction ratio (R).

27. The device of claim 26, wherein the scaling factor (ESF) is computed from a logarithmic function of the reduction ratio (R).

28. The device of claim of claim 27, wherein the scaling factor (ESF) is computed from $$ESF = 1 + 0.005 \log_2 R.$$

29. The device of claim 25, wherein the scaling factor (ESF) is computed based on the image statistics (L) and the reduction ration (R).

30. The device of claim 29, wherein the image statistics including average run-length (L) of the input image.

31. The device of claim 30, wherein the scaling factor (ESF) is computed from a logarithmic function of the reduction ration (R) and a hyperbolic function of the average run-length of the input image.

32. The device of claim 31, wherein the scaling factor (ESF) is computed from $$ESF = 1 + 0.05 \log_2 R.L\gamma$$

where $L\gamma = 0.3 + \tanh(L-1)$.

33. The device of claim 25, wherein the scaling factor ESF is substantially equal to 1.

34. The device of claim 25, wherein the scaling factor ESF is slightly less than 1.

35. A software product comprising a computer readable medium for use in reducing an input image of an original image size (F, N) for providing a reduced image of a target image size ($F_n$) smaller than the original image size, wherein the input image is formed from a first palette and contains image statistics (L,H) inherent to palette index coefficients indicative of the input image, the first palette having a first palette size with a first number of colors, the computer readable medium having executable pseudo-codes embedded therein, and the pseudo-codes, when executed, carry out the steps of:

selecting a second palette size smaller than the first palette size; and color mapping the first palette based on the second palette size for providing a second palette for use in forming the reduced image, the second palette having a second number of colors smaller than the first number of colors by a reduction ratio (R), wherein the reduction ratio is at least partially based on a relationship between the target image size and the original image size.

36. The software product of claim 35, wherein the pseudo-codes further carry out the steps of:

obtaining a first statistical size ($S_0$) of the input image based on the image statistics (L, H) and the original image size (N) of the input image;

computing a second statistical size (S) of the reduced image based on the second palette; and estimating the image size ($S_f$) of the reduced image based on the first image size (F), the first statistical size ($S_0$), the second statistical size (S) and the reduction ratio (R).

37. The software product of claim 36, wherein the pseudo-codes further carry out the steps of adjusting the second palette size; and repeating the color mapping, computing and estimating steps until a difference between the estimated image size ($S_f$) and the target image size ($F_n$) falls within a predetermined limit.

38. The software product of claim 36, wherein the pseudo-codes further carry out the step of providing a scaling factor (ESF) for adjusting the estimated image size ($S_f$), and wherein the scaling factor (ESF) is computed based on the image statistics (L) and the reduction ration (R), the image statistics including average run-length (L) of palette index coefficients in the input image, and the scaling factor (ESF) is computed from $$ESF = 1 + 0.05 \log_2 R.L\gamma$$

where $L\gamma = 0.3 + \tanh(L-1)$.

* * * * *

UNITED STATES PATENT AND TRADEMARK OFFICE
CERTIFICATE OF CORRECTION

PATENT NO. : 6,937,759 B2
DATED : August 30, 2005
INVENTOR(S) : Ridge

It is certified that error appears in the above-identified patent and that said Letters Patent is hereby corrected as shown below:

Column 10,
Line 7, "$ESF=1=0.05 \log_2 R.L\gamma$" should be -- $ESF=1+0.05 \log_2 R.L\gamma$ --.

Column 11,
Line 13, "The device of claim of claim 27" should be -- The device of claim 27 --.
Lines 18 and 23, "ration" should be -- ratio --.

Column 12,
Line 34, "ration" should be -- ratio --.

Signed and Sealed this

Tenth Day of January, 2006

JON W. DUDAS
*Director of the United States Patent and Trademark Office*